3,812,096
N-DEMETHYLCELESTICETIN DERIVATIVES
Alexander D. Argoudelis, Portage, and John H. Coats and Oldrich K. Sebek, Kalamazoo, Mich., assignors to The Upjohn Company, Kalamazoo, Mich.
No Drawing. Filed June 12, 1972, Ser. No. 261,724
Int. Cl. C07c 129/18
U.S. Cl. 260—210 R                         4 Claims

ABSTRACT OF THE DISCLOSURE

New antibiotics, N-demethyl-7-O-demethylcelesticetin (IV) and N-demethylcelesticetin (IVa), are produced concomitantly by the controlled fermentation of the new micro-organism *Streptomyces caelestis* strain 22218a in an aqueous nutrient medium. These antibiotics are antibacterially active and also can be converted to various antibacterially active analogues.

BACKGROUND OF THE INVENTION

Celesticetin is an antibacterially active compound which is disclosed in U.S. Pat. 2,928,844. It can be represented by the following structural formula:

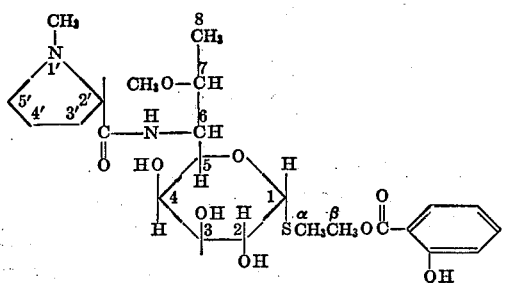

Celesticetin can be hydrolyzed according to the process disclosed in U.S. Pat. 2,851,463 to produce the compound desalicetin which can be represented by the following structural formula:

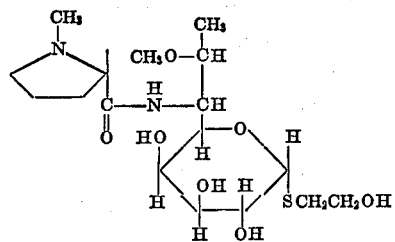

These celesticetin compounds are structurally related somewhat to the well-known antibiotic lincomycin which can be represented by the following structural formula:

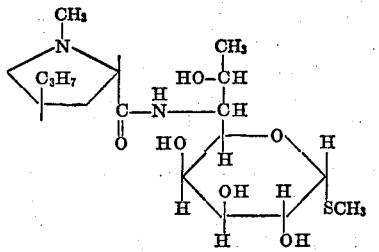

BRIEF SUMMARY OF THE INVENTION

The novel compounds of the invention, N-demethyl-7-O-demethylcelesticetin (U-39,579) and N-demethylcelesticetin (U-40,585), are obtained by culturing *Streptomyces caelestis* strain 22218a, NRRL 5481, in an aqueous nutrient medium. N-demethyl-7-O-demethylcelesticetin can be represented by the following structural formula:

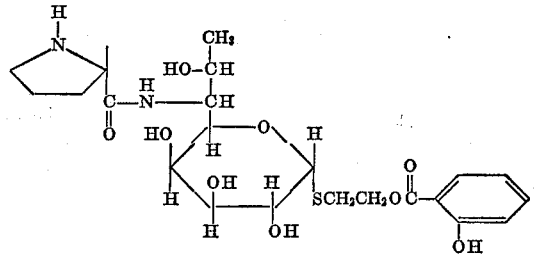

N-demethylcelesticetin can be represented by the following structural formula:

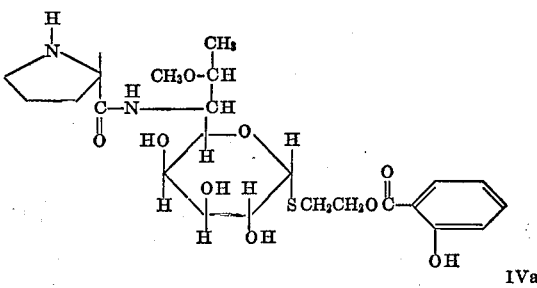

Upon the treatment of N-demethyl-7-O-demethylcelesticetin (IV) with a suitable base, for example, sodium hydroxide, potassium hydroxide, ammonium hydroxide, and the like, there is produced N-demethyl-7-O-demethyldesalicetin which can be represented by the following structural formula:

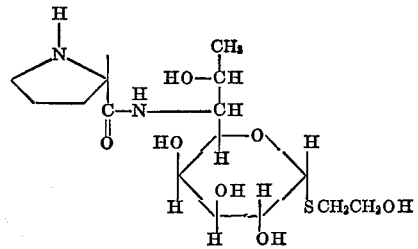

Likewise, upon treatment of N-demethylcelesticetin (IVa) with a base, as above, there is produced N-demethyldesalicetin which can be represented by the following structural formula:

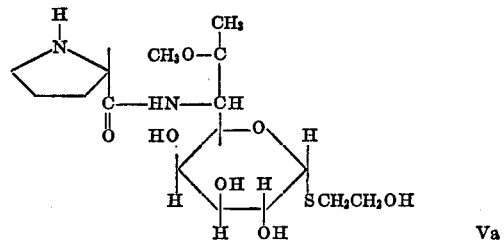

Treatment of N-demethyl-7-O-demethylcelesticetin with hydrazine hydrate yields β-hydroxyethylthiolincosaminide (β-HETL) which can be represented by the following structural formula:

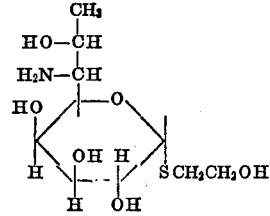

In addition to β-hydroxyethylthioincosaminide, there is produced L-proline hydrazide which can be transformed to L-proline hydrochloride by heating with aqueous hydrochloric acid. The sequence of this latter reaction can be shown as follows:

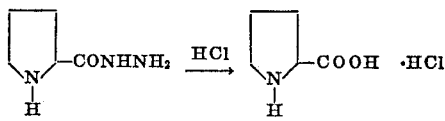

N-demethyl-7-O-demethylcelesticetin (IV) can be converted to various antibacterially active analogues. Compound (IV) and these analogues can be represented by the following structural formula:

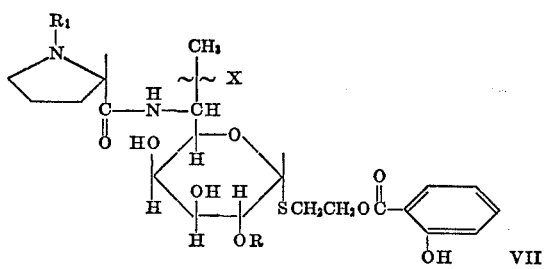

VII wherein X is —OH in the (R) and (S) configuration; halo in the (R) and (S) configuration; alkoxy of not more than 20 carbon atoms in the (R) and (S) configuration excepting where X is (R)=OCH₃, R is hydrogen and R₁ is methyl; R is hydrogen or is selected from the group consisting of hydrocarbon carboxylic acid acyl of not more than 18 carbon atoms, or a halo-, nitro-, hydroxy-, amino-, thiocyano-, and lower alkoxy-hydrocarbon carboxylic acid acyl of not more than 18 carbon atoms, inclusive, and

and R₁ is hydrogen, alkyl of from 1 to 20 carbon atoms, inclusive, or hydroxyalkyl of from 2 to 5 carbon atoms, inclusive.

N-demethylcelesticetin (IVa) can be converted to various antibacterially active analogues. These analogues can be represented by the following structural formula:

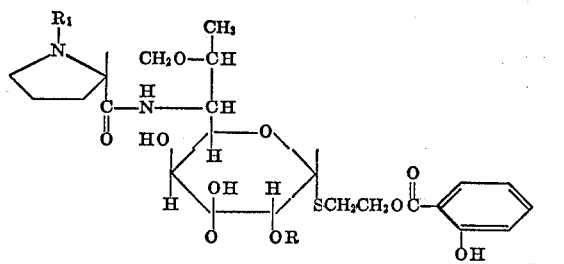

VIIa wherein R is hydrogen or is selected from the group consisting of hydrocarbon carboxylic acid acyl of not more than 18 carbon atoms, or a halo-, nitro-, hydroxy-, amino-, thiocyano-, and lower alkoxy-hydrocarbon carboxylic acid acyl of not more than 18 carbon atoms, inclusive,

and R₁ is hydrogen, or alkyl of from 2 to 20 carbon atoms, inclusive, or hydroxyalkyl of from 2 to 5 carbon atoms, inclusive.

N-demethyl-7-O-demethyldesalicetin (V) can be converted to various antibacterially active analogues. Compound (V) and these analogues can be represented by the following structural formula:

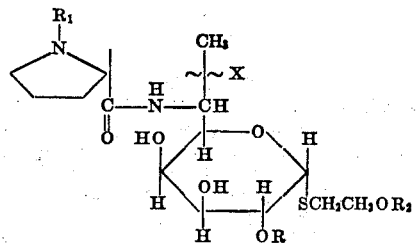

VIII wherein X, R, and R₁ are as defined above; and R₂ is hydrogen or is selected from the group consisting of hydrocarbon carboxylic acid acyl of not more than 18 carbon atoms, or a halo-, nitro-, hydroxy-, amino-, thiocyano-, and loweralkoxy-hydrocarbon carboxylic acid acyl of not more than 18 carbon atoms, inclusive, except that R₂ is not the salicylic acid moiety when X is (R)-OCH₃ and R is hydrogen and R₁ is methyl.

N-demethyldesalicetin (Va) can be converted to various antibacterially active analogues. These analogues can be represented by the following structural formula:

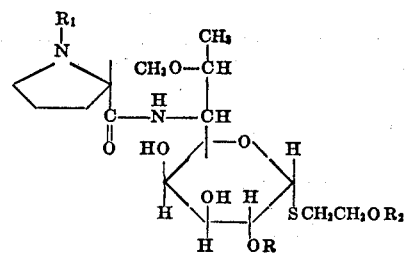

VIIIa wherein R and R₁ are as defined above; and R₂ is hydrogen or is selected from the group consisting of hydrocarbon carboxylic acid acyl of not more than 18 carbon atoms, or a halo-, nitro-, hydroxy-, amino-, thiocyano-, and loweralkoxy-hydrocarbon carboxylic acid acyl of not more than 18 carbon atoms, inclusive; except that R₂ is not the salicylic acid moiety when R is hydrogen and R₁ is methyl.

β - Hydroxyethylthiolincosaminide (VI) can be converted to various analogues which can be represented by the following structural formula:

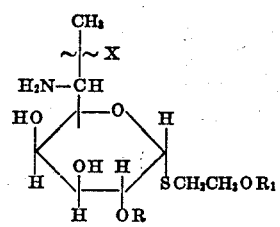

IX wherein X, R, and R₁ are as defined above.

Compounds of formula IX can be converted to antibacterially active compounds by coupling with a pyrrolidinecarboxylic acid as disclosed in U.S. Pat. 3,514,440. The compounds formed, as well as the process, are disclosed in said patent.

Examples of alkoxy of not more than 20 carbon atoms are methoxy, ethoxy, propoxy, butoxy, pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, and eicosyloxy and the isomeric forms thereof. Examples of halo are chlorine, bromine and iodine.

Examples of hydrocarbon carboxylic acid acyl of not more than 18 carbon atoms, or a halo-, nitro-, hydroxy-, amino-, thio-, cyano-, and loweralkoxy-hydrocarbon carboxylic acid acyl of not more than 18 carbon atoms, inclusive, are as disclosed in U.S. Pat. 3,426,012, column 5, line 64 to column 6, line 47. Examples of alkyl of from 1 to 20 carbon atoms are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl, and the isomeric forms thereof.

DETAILED DESCRIPTION

Chemical and physical properties of N-demethyl-7-O-demethylcelesticetin hydrochloride Elemental analysis:
  Calc'd. for $C_{22}H_{32}N_2O_9S \cdot HCl$: C, 49.25; H, 6.15; N, 5.22; S, 5.97; Cl, 6.53.
  Calc'd. for $C_{22}H_{32}N_2O_9S \cdot HCl \cdot H_2O$: C, 47.65; H, 6.31; N, 5.06; S, 5.77; Cl, 6.31.
  Found: C, 46.78; H, 6.01; N, 5.32; S, 5.34; Cl, 6.13.

Molecular weight: The calculated molecular weight for the hydrochloride is 536; N-demethyl-7-O-demethylcelesticetin free base has a molecular weight of 500 (determined by mass spectrometry).

Specific rotation:
  $[\alpha]_D^{25} = +122°$ (c., 1, water)
  $= +163°$ (c., 1, dimethylformamide)

Ultraviolet absorption spectra:
  In water:
    $\lambda_{max.}$ at 204 m$\mu$ ($a=66.01$; $\epsilon=33,000$)
    $\lambda_{max.}$ at 238 m$\mu$ ($a=17.66$; $\epsilon=8,850$)
    $\lambda_{max.}$ at 303 m$\mu$ ($a=7.20$; $\epsilon=3,600$)
  In 0.01 N aqueous NaOH:
    $\lambda_{max.}$ at 241 m$\mu$ ($a=11.84$; $\epsilon=5,900$)
    $\lambda_{max.}$ at 332 m$\mu$ ($a=8.39$; $\epsilon=4,200$)

Infrared absorption spectra: Following is a tabulation of the infrared absorption spectrum wave lengths in mineral oil mull expressed in reciprocal centimeters:

| Band frequency (cm.$^{-1}$) | Intensity |
|---|---|
| 3660 | (SH) M |
| 3540 | (SH) S |
| 3340 | S |
| 3340 | S |
| 3260 | S |
| 3090 | S |
| 2925 | (oil) S |
| 2860 | (oil) S |
| 2625 | M |
| 2430 | W |
| 1717 | W |
| 1667 | S |
| 1610 | S |
| 1582 | S |
| 1483 | S |
| 1460 | (oil) S |
| 1432 | (SH) S |
| 1403 | M |
| 1387 | (SH) S |
| 1383 | S |
| 1375 | (oil) S |
| 1340 | M |
| 1322 | S |
| 1298 | S |
| 1265 | S |
| 1247 | S |
| 1211 | S |
| 1190 | M |
| 1155 | S |
| 1135 | M |
| 1092 | S |
| 1080 | S |
| 1067 | S |
| 1047 | S |
| 991 | M |
| 972 | M |
| 952 | M |
| 903 | W |
| 875 | M |
| 852 | M |
| 815 | M |
| 803 | M |
| 760 | M |
| 720 | M |
| 703 | M |

Following is a tabulation of the infrared absorption spectrum wave lengths where the compound is pressed into a KBr pellet expressed in reciprocal centimeters:

| Band frequency (cm.$^{-1}$) | Intensity |
|---|---|
| 3465 | S |
| 3260 | S |
| 3080 | S |
| 2980 | S |
| 2740 | M |
| 1715 | (SH) W |
| 1667 | S |
| 1610 | S |
| 1580 | S |
| 1560 | (SH) S |
| 1487 | S |
| 1457 | M |
| 1400 | (SH) S |
| 1385 | S |
| 1322 | S |
| 1299 | S |
| 1265 | S |
| 1248 | S |
| 1211 | S |
| 1193 | (SH) M |
| 1157 | S |
| 1135 | S |
| 1087 | S |
| 1077 | (SH) S |
| 1045 | S |
| 1010 | (SH) M |
| 987 | M |
| 972 | M |
| 950 | M |
| 903 | W |
| 870 | M |
| 812 | W |
| 800 | M |
| 756 | M |
| 702 | M |

Infrared band intensities, throughout this disclosure, are indicated as "S," "M," and "W," respectively, and are approximated in terms of the background in the vicinity of the bands. An "S" band is of the same order of intensity as the strongest in the spectrum; "M" bands are between ⅓ and ⅔ as intense as the strongest band; and, "W" bands are less than ⅓ as intense as the strongest band. These estimates are made on the basis of a percent transmission scale. "SH" denotes a shoulder.

Antibacterial activity of N-demethyl-7-O-demethylcelesticetin

| Test microorganism: | Minimum inhibitory concentration in mcq./ml. |
|---|---|
| Staphylococcus aureus | 15.6 |
| Streptococcus hemolyticus | 7.8 |
| Streptococcus faecalis | 31.2 |
| Escherichia coli | >500 |
| Proteus vulgaris | >500 |
| Klebsiella pneumoniae | >500 |
| Pseudomonas aeruginosa | >500 |

The above antibacterial spectrum was obtained by a tube dilution assay procedure. This procedure was conducted with the medium BHI (Brain Heart Infusion Broth, Difco, Detroit, Mich.). Assay tubes (13 mm. x 100 mm.) were prepared in the customary manner as set out in Snell, E. E., Vitamin Methods, vol. 1, Academic Press, Inc., New York (1950), p. 327. Test organisms grown for 18 hours at 37° C. were added to inoculate the test medium. The results were read at 17 hours.

Chemical and physical properties of n-demethylcelesticetin hydrochloride

Elemental analysis: Elemental analysis showed the presence of C, H, N, S and Cl in the molecule. High resolution mass spectrometry on a trimethylsilyl ether derivative showed molecular ion at 874.3967 mass units (average of 4 determinations). Theoretical for $$C_{38}H_{74}N_2O_9SSi_5$$

is 874.3958 mass units. These results indicate the molecular formula of $C_{23}H_{34}N_2O_9S$ for the antibiotic.

Furthermore the $M^+-CH_3$ peak was measured at 859.3724.

Theoretical for $C_{37}H_{71}N_2O_9SSi_5$ is 859.3723.

Molecular weight: 514 (determined by mass spectrometry).

Specific rotation: $[\alpha]_D^{25} = 112.5°$ (c., 1, water).

Ultraviolet absorption spectrum (in methanol):
$\lambda_{max.}$ at 238 m$\mu$ ($a$=15.5)
$\lambda_{max.}$ at 304 m$\mu$ ($a$=7.2)

Infrared absorption spectra: Following is a tabulation of the infrared absorption spectrum wave lengths in mineral oil mull expressed in reciprocal centimeters' CMFW eral oil mull expressed in reciprocal centimeters:

| Band frequency (cm.$^{-1}$): | Intensity |
|---|---|
| 3300 | S |
| 3080 | S |
| 2925 (oil) | S |
| 2860 (oil) | S |
| 1670 | S |
| 1610 | S |
| 1579 | S |
| 1562 | S |
| 1483 | S |
| 1467 (oil) | S |
| 1455 (oil) | S |
| 1375 (oil) | S |
| 1322 | S |
| 1296 | S |
| 1247 | S |
| 1210 | S |
| 1155 | S |
| 1138 | S |
| 1086 | S |
| 1057 | S |
| 1002 | M |
| 986 | M |
| 975 | M |
| 950 | W |
| 905 | W |
| 865 | M |
| 815 | W |
| 797 | M |
| 757 | S |
| 719 (oil) | M |
| 701 | S |

Following is a tabulation of the infrared absorption spectrum wave lengths where the compound is pressed into a KBr pellet expressed in reciprocal centimeters:

| Band frequency (cm.$^{-1}$): | Intensity |
|---|---|
| 3380 | S |
| 3260 | S |
| 3080 | S |
| 2980 | S |
| 2930 | M |
| 2820 | M |
| 1668 | S |
| 1610 | S |
| 1578 | M |
| 1557 | S |
| 1486 | S |
| 1455 | M |
| 1387 | S |
| 1320 | S |
| 1298 | S |
| 1247 | S |
| 1212 | S |
| 1155 | S |
| 1137 | S |
| 1085 | S |
| 1055 | S |
| 985 | M |
| 950 | M |
| 905 | W |
| 867 | M |
| 812 | W |
| 796 | M |
| 755 | M |
| 700 | S |

Antibacterial activity of N-dimethylcelesticetin

| Test microorganism: | Minimum inhibitory concentration in mcg./ml. |
|---|---|
| Staphylococcus aureus | 15.6 |
| Streptococcus hemolyticus | <0.125 |
| Streptococcus faecalis | 7.8 |
| Escherichia coli | >500 |
| Proteus vulgaris | >500 |
| Klebsiella pneumoniae | 250 |
| Pseudomonas aeruginosa | >500 |
| Diplococcus pneumoniae | 0.5 |

The above test results were obtained using the assay and conditions disclosed above for the antibacterial test of N-demethyl-7-O-demethylcelesticetin.

THE MICROORGANISM

The microorganism used for the production of the antibiotics of the subject invention is a mutant of Streptomyces caelestis, NRRL 2418, which has been named Streptomyces caelestis strain 22218a. This mutant is distinguishable from Streptomyces caelestis taxonomically, as shown hereinafter, and by its ability to produce N-demethyl-7-O-demethylcelesticetin and N-demethylcelesticetin. A subculture of the living organism can be obtained from the permanent collection of the Northern Utilization and Research Division, Agricultural Research Service, U.S. Department of Agriculture, Peoria, Ill., U.S.A. Its accession number in this repository is NRRL 5481.

The microorganism of this invention was studied and characterized by Alma Dietz of the Upjohn Research Laboratories.

DESCRIPTION OF THE MICROORGANISM

Streptomyces caelestis strain 22218a, UC 5515

Streptomyces caelestis strain 22218a is compared with the parent culture (which is also the type culture) Streptomyces caelestis [De Boer, C., A. Dietz, J. R. Wilkins, C. N. Lewis and G. M. Savage, 1954–1955. Celesticetin—A new, crystalline antibiotic. I. Biologic studies of celesticetin. Antibiotics Annual, New York. Medical Encyclopedia, Inc., 1955, pp. 831–836], UC 2011, NRRL 2418.

Taxonomic methods: The methods used were those cited in Dietz [Dietz, A., 1967. Streptomyces steffiisburgensis sp. n. J. Bacteriol. 94:2022–2026] and, in part, those cited in Shirling and Gottlieb [Shirling, E. B., and D. Gottlieb, 1966. Methods for characterization of Streptomyces species. Int. J. Syst. Bacteriol. 16:313–340].

Color characteristics: Aerial growth blue (sporulating) for the parent; white with trace blue on some media (non-sporulating to trace sporulating) for the mutant. Parent: melanin-positive; strain: melanin-negative. Appearance on Ektachrome [Dietz, A. 1954. Ektachrome transparencies as aids in actinomycete classification. Ann. N.Y. Acad. Sci. *60*:152–154] is given in Table 1. Reference color characteristics are given in Table 2. The parent culture may be placed in the White (W), Green (GN), or Gray (GY) series of Tresner and Backus [Tresner, H. D., and E. J. Backus, 1962. System of color wheels for Streptomycete taxonomy. Appl. Microbiol. *11*:335–338]; the mutant in the White (W) and Yellow (Y) series.

Microscopic characteristics: The parent and the mutant have open spiral to spiral sporophores (in the sense of Pridham et al. [Pridham, T. G., C. W. Hesseltine, and R. G. Benedict. 1958. A guide for the classification of Streptomycetes according to selected groups. Placement of strains in morphological sections. Appl. Microbiol. *6*:52–79]) bearing rectangular smooth spores (in the sense of Dietz and Mathews [Dietz, A., and J. Mathews. 1970 Classification of Streptomyces spore surfaces into five groups. Appl. Microbiol. *21*:527–533]) with ridged surface structure. The mutant strain has distorted mycelium with large round bodies when observed by the transmission electron microscope.

Cultural characteristics: See Table 3.

Carbon utilization: See Tables 4 and 5.

Temperature: *S. caelestis* strain 22218a and the parent *S. caelestis* grow at 18–55° C. Growth is poor at the extremes and optimum at 28–37° C.

Antibiotic producing properties: *Streptomyces caelestis* strain 22218a produces 7-O-demethyl-N-demethylcelesticetin (U–39, 579) and N-demethylcelesticetin (U–40, 585).

DISCUSSION

*Streptomyces caelestis* strain 22218a, NRRL 5481, a mutant of *Streptomyces caelestis* UC 2011, NRRL 2418, is shown to have cultural characteristics distinctly different from those of the parent. It does have the distinctive sporophore and spore characteristics of the parent strain in its sporulating sectors which are celestial blue (the color of the parents sporulating aerial growth).

The culture characterized as *Streptomyces caelestis* strain 22218a has been so designated in accordance with Recommendation 8a of the International Code of Nomenclature of Bacteria, 1966, edited by the Editorial Board of the Judicial Commission of the International Committee on Nomenclature of Bacteria, Intern. J. System. Bacteriol. *16*: 459–490, in which a number which is a laboratory distinguishing mark may be used to designate the descendents of a single isolation in pure culture.

The characteristics of *Streptomyces caelestis* strain 22218a, NRRL 5481, are given in the following tables:

Table 1.—Appearance of *S. caelestis* Cultures on Ektachrome

Table 2.—Reference Color Characteristics of *S. caelestis* Cultures

Table 3.—Cultural Characteristics of *S. caelestis* Cultures

Table 4.—Utilization of Carbon Compounds in the Synthetic Medium of Pridham and Gottlieb Table 5.—Utilization of Carbon Compounds in the Synthetic Medium of Shirling and Gottlieb

TABLE 1

Appearance of *S. caelestis* cultures on Ektachrome [1]

| Agar medium | S. caelestis strain 22218a | S. caelestis NRRL 2418 |
|---|---|---|
| Bennett's: | | |
| S | Pale gray-white | Blue-gray. |
| R | Yellow | Tan-brown. |
| Czapek's sucrose: | | |
| S | White | White. |
| R | Cream | Yellow-cream. |
| Maltose-tryptone: | | |
| S | Pale gray-white | Blue-gray. |
| R | Yellow | Brown. |
| Peptone iron: | | |
| S | | |
| R | Yellow-tan | Brown. |
| 0.1% tyrosine: | | |
| S | Trace white | Trace gray. |
| R | Red | Red. |
| Casein starch: | | |
| S | Trace white | Trace blue-gray. |
| R | Colorless | Tan. |

[1] Dietz, A., 1954. Ektachorme tranparencies as aids in actinomycete classification. Ann. N.Y. Acad. Sci. 60:152–54.

NOTE: S=Surface.  R=Reverse.

TABLE 2

Reference color characteristics of *S. caelestis* cultures

| | Color harmony manual, 3rd ed., 1948 [a] | | NBS circular 553, 1955 [b] | |
|---|---|---|---|---|
| Agar medium | S. caelestis strain 22218a | S. caelestis NRRL 2418 | S. caelestis strain 22218a | S. caelestis NRRL 6418 |
| Bennett's: | | | | |
| S | a white | c light gray | 263 gm white | 264 gm light gray. |
| R | 2ca light ivory, eggshell | 2gc bamboo, chamois | 89 gm pale yellow | 90 gm grayish yellow. |
| P | | 2ge covert tan, griege | | 94m light olive brown. |
| Czapek's sucrose: | | | | |
| S | | a white | | 263 gm white. |
| R | | 2ca light ivory, eggshell | | 89 gm pale yellow. |
| P | | | | |
| Maltose-tryptone: | | | | |
| S | a white | c light gray | 263 gm white | 264 gm light gray. |
| R | 2ca light ivory, eggshell | 3lg adobe brown, cinnamon brown, light brown | 89 pale yellow | 77 gm moderate yellowish brown. |
| P | 2ge covert tan, griege | 3ig beige brown, mist brown | {94m light olive brown / 109 gm light grayish olive | 80m grayish yellowish brown. / 95g moderate olive brown. |
| Yeast extract-malt extract (ISP-2): | | | | |
| S | 2ba pearl, shell tint | c white | 92 gm yellowish white | 264 gm light gray. |
| R | 2ca light ivory, eggshell | 2le light mustard tan | 89 gm pale yellow | {91 gm dark grayish yellow. / 94 g light olive brown. / 106 g light olive. |
| P | 2ge covert tan, griege | 2ge covert tan, griege | {94 light olive brown / 104 gm light grayish olive | 94 m light olive brown. / 109 gm light grayish olive. |
| Oatmeal (ISP-3): | | | | |
| S | c light gray | e gray | 264 gm light gray | |
| R | 1½ca cream | 1½ec putty | 89 gm pale yellow | {90 gm grayish yellow. / 93 m yellowish gray. |
| P | | 1dc putty, griege | | {121 m pale yellow green. / 122 g grayish yellow green. |
| Inorganic-salts starch (ISP-4): | | | | |
| S | c light gray | 19dc aqua gray | 264 gm light gray | {149 g pale green. / 190 m light bluish gray. |
| R | 2ca light ivory, eggshell | 2ec biscuit, ecru, oatmeal, sand | 89 gm pale yellow | 90 gm grayish yellow. |
| P | 2fe covery gray | 1ec light citron gray, putty | {94 light olive brown / 112 gm light olive gray | 121 m pale yellow green. / 122 g grayish yellow green. |
| Glycerol-asparagine (ISP-5): | | | | |
| S | a white | a white | 263 gm white | 263 gm white. |
| R | 2ca light ivory, eggshell | 1½ca cream | 89 gm pale yellow | 89 gm pale yellow. |
| P | | | | |

[a] Jacobson, E., W. C. Granville, and C. E. Foss. 1948. Color Harmony Manual, 3d Ed. Container Corporation of America, Chicago.

[b] Kelly, K. L., and D. B. Judd. 1955. The ISCC-NBS Method of Designating Colors and a Dictionary of Color Names. U.S. Dept. of Comm. Circ. 353, Washington, D.C.

NOTE: S=Surface.  R=Reverse.  P=Pigment.

TABLE 3
Cultural characteristics of *S. caelestis* cultures

| | | S. caelestis strain 22218a | S. caelestis, NRRL 2418 |
|---|---|---|---|
| Agar medium: | | | |
| Peptone-iron: | S | | None to very slight trace gray. |
| | R | Tan | Brown. |
| | P | Pale tan | Do. |
| | O | Melanin negative | Melanin positive. |
| Calcium malate: | S | Trace white | Slight blue-white. |
| | R | Gray-white | Cream. |
| | P | | |
| | O | Malate solubilized around growth. | |
| Glucose asparagine: | S | Trace white | Fair blue-gray white. |
| | R | Cream | Cream. |
| | P | | |
| Skim milk: | S | | |
| | R | Pale yellow-tan | Tan-brown. |
| | P | do | Tan. |
| | O | Casein solubilized under growth. | Casein not solubilized. |
| Tyrosine: | S | Pale blue-gray | Blue-gray. |
| | R | Pale yellow | Light brown. |
| | P | do | Do. |
| | O | Tyrosine solubilized around growth. | Tyrosine solubilized. |
| Xanthine: | S | | Pale gray. |
| | R | Cream | Pale tan. |
| | P | do | Do. |
| | O | Xanthine solubilized around growth. | Xanthine not solubilized. |
| Nutrient starch: | S | Very slight trace blue-white. | Pale gray. |
| | R | Cream | Cream yellow. |
| | P | Pale yellow | Yellow. |
| | O | Starch hydrolyzed | Starch hydrolyzed. |
| Yeast extract–malt extract: | S | Pale blue-white | Blue-gray-white. |
| | R | Yellow | Gray-tan. |
| | P | Pale yellow | Tan. |
| Bennett's: | S | White | Heavy pale-blue-white. |
| | R | Cream | Cream. |
| | P | | Yellow-tan. |
| Czapek's sucrose: | S | Trace white | Good white. |
| | R | Cream white | Pale cream. |
| | P | | |
| Maltose-tryptone: | S | White | Heavy pale-blue-white. |
| | R | Cream | Pale tan. |
| | P | | Do. |
| Peptone-yeast extract-iron (ISP-6): | S | | |
| | R | Colorless | Brown. |
| | P | | Do. |
| Tyrosine (ISP-7): | S | White tinged with blue | White with trace blue. |
| | R | Pink-tan | Brown. |
| | P | | Light brown. |
| Gelatin media: | | | |
| Plain: | P | | Trace brown at surface. Pale yellow-tan brown throughout. |
| | O | No liquefaction | No liquefaction. |
| Nutrient: | P | Yellow | Trace brown at surface. Yellow-tan throughout. |
| | O | Liquefaction—½ | No liquefaction. |
| Broth media: | | | |
| Synthetic nitrate: | S | | Colorless surface ring with trace white aerial. |
| | P | | |
| | O | Trace colorless bottom growth. Nitrate not reduced to nitrite. | Growth throughout. Flocculent at base. Nitrate reduced to nitrite. |
| Nutrient nitrate: | S | Colorless surface ring | Colorless surface ring with white aerial growth. |
| | P | | Pale tan. |
| | O | Compact bottom growth. Nitrate not reduced to nitrite. | Nitrate reduced to nitrite. |
| Litmus milk: | S | Red-tan surface ring | Red-tan surface ring. |
| | O | pH 6.4 | Litmus reduced. Coagulation positive pH 4.9. |

NOTE: S=Surface.  R=Reverse.  P=Pigment.  O=Other characteristics.

TABLE 4
Utilization of carbon compounds in the synthetic medium of Pridham and Gottlieb [1]

| | | S. caelestis strain 22218a | S. caelestis NRRL 2418 |
|---|---|---|---|
| | Control | (−) | (−) |
| 1 | D-xylose | + | + |
| 2 | L-arabinose | + | + |
| 3 | Rhamnose | + | + |
| 4 | D-fructose | + | + |
| 5 | D-galactose | + | + |
| 6 | D-glucose | + | + |
| 7 | D-mannose | + | + |
| 8 | Maltose | + | + |
| 9 | Sucrose | + | + |
| 10 | Lactose | + | + |
| 11 | Cellobiose | + | + |
| 12 | Raffinose | + | + |
| 13 | Dextrin | + | + |
| 14 | Inulin | − | (−) |
| 15 | Soluble starch | + | + |
| 16 | Glycerol | (+) | + |
| 17 | Dulcitol | (−) | (−) |
| 18 | D-mannitol | (+) | (−) |
| 19 | D-sorbitol | (+) | (−) |
| 20 | Inositol | + | + |
| 21 | Salicin | (−) | (−) |
| 22 | Phenol | − | − |
| 23 | Cresol | − | − |
| 24 | Na formate | − | (−) |
| 25 | Na oxalate | (−) | (−) |
| 26 | Na tartrate | (−) | (−) |
| 27 | Na salicylate | − | − |
| 28 | Na acetate | (+) | (+) |
| 29 | Na citrate | (+) | (+) |
| 30 | Na succinate | (+) | (+) |

[1] Pridham, T. G., and D. Gottlieb. 1948. The Utilization of Carbon Compounds by some Actinomycetales as an Aid for Species Determination. J. Bacteriol. 56:107–114.

NOTE: +=Good utilization.  (+)=Moderate utilization.  (−)=Doubtful utilization.  −=No utilization.

TABLE 5
Utilization and carbon compounds in the synthetic medium of Shirling and Gottlieb [1]

| | S. caelestis strain 22218a | S. caelestis NRRL 2418 |
|---|---|---|
| Plain agar (negative control) | ± | ± |
| D-glucose (positive control) | + | + |
| L-arabinose | ++ | + |
| Sucrose | ++ | ++ |
| D-xylose | ++ | ++ |
| Inositol | ++ | ++ |
| D-mannitol | ++ | − |
| D-fructose | ++ | ++ |
| Rhamnose | ++ | ++ |
| Raffinose | ++ | ++ |
| Cellulose | ± | ± |

[1] Shirling, E. B., and D. Gottlieb. 1966. Methods for Characterization of Streptomyces species. Int. J. Syst. Bacteriol. 16:313–340.

NOTE: ++=Strong utilization.  +=Moderate utilization.  ±=Doubtful utilization.  −=No utilization.

The new compounds of the invention are produced when the elaborating organism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include cornsteep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, need not be added to the fermentation media since tap water and unpurified ingredients are used as components of the medium.

Production of the compounds of the invention can be effected at any temperature conducive to satisfactory growth of the microorganism, for example, between about 18° and 40° C., and preferably between 20° and 32° C. Ordinarily, optimum production of the compounds is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the new compounds and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compounds, as long as it is such that a good growth of the microorganism is obtained.

The new compounds of the invention, N-demethyl-7-O-demethylcelesticetin (IV) and N-demethylcelesticetin (IVa), exist either in the non-protonated (free base) form or the protonated (salt) form depending on the pH of the environment. They form stable protonates (acid addition salts) by neutralization of the free base with an acid or by metathesis between the protonated form of the antibiotic and the anion of an acid. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2 - cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric, and the like acids. These acid addition salts are useful in upgrading the free base.

Because of the presence of the salicylic acid moiety, N-demethyl-7-O-demethylcelesticetin (IV) and N-demethylcelesticetin (IVa) form salts with alkali metals and alkaline earth metals by procedures well known in the art. Salts which can be made are the sodium, potassium, calcium, lithium, and the like. These salts have the uses disclosed above for the acid addition salts.

N-demethyl-7-O-demethylcelesticetin (IV) and N-demethylcelesticetin (IVa) are soluble in lower alcohols of from 1 to 4 carbon atoms, inclusive, and ketones; they are less soluble in water and chlorinated hydrocarbon solvents; and essentially insoluble in ether and saturated hydrocarbon solvents.

A variety of procedures can be employed in the isolation and purification of N-demethyl - 7 - O - demethylcelesticetin (IV) and N-demethylcelesticetin (IVa), for example, solvent extraction, partition chromatography, silica gel chromatography, liquid-liquid distribution in a Craig apparatus, and crystallization from solvents.

In a preferred recovery process, N-demethyl-7-O-demethylcelesticetin (IV) and N-demethylcelesticetin (IVa) are recovered from the culture medium by separation of the mycelia and undissolved solids by conventional means, such as by filtration or centrifugation. The antibiotics are then removed from the filtered or centrifuged broth by resin sorption on a resin comprising a non-ionic macro porous copolymer of styrene crosslinked with divinylbenzene. Suitable resins are Amberlite XAD-1 and XAD-2 disclosed in U.S. Pat. 3,515,717. The resin is eluted with an organic or aqueous organic solvent in which the sorbed antibiotics are soluble. Ninety-five percent aqueous methanol is the preferred solvent for elution. The antibiotic mixture in the methanol eluates is purified by concentrating the eluates to dryness and then subjecting them to counter double current distribution using 1-butanol-water (1:1 v./v.) as the solvent system. Fractions containing N-demethyl-7-O-demethylcelesticetin are concentrated to dryness and the antibiotic crystallizes by triturating with methanol.

Fractions containing N-demethylcelesticetin are subjected to countercurrent distribution using a solvent system consisting of 1-butanol-water (1:1 v./v.). The N-demethyl-7-O-demethylcelesticetin which is present in small amounts in collected fractions which contain predominantly N-demethylcelesticetin is isolated by use of silica gel chromatography. This purification step affords a facile separation of the antibiotics. Fractions from the silica gel chromatography column which contain only N-demethylcelesticetin are concentrated to dryness; the resulting residue is dissolved in methanolic hydrogen chloride, and this solution is mixed with ether. The resulting precipitated N-demethylcelesticetin hydrochloride is isolated by filtration and dried.

The presence of N-demethyl-7-O-demethylcelesticetin (IV) and N-demethylcelesticetin (IVa) in the fermentation beer and various recovery liquids is determined by activity against the microorganism *S. lutea*. This is a standard microbiological disc plate assay using 12.5 mm. discs. Thin layer chromatography (TLC) using silica gel G and a solvent mixture consisting of chloroform-methanol (6:1 v./v.) is used to identify the presence of either or both of the antibiotics in a sample showing activity against *S. lutea*, as described above. On this chromatographic system, N-demethyl-7-O-demethylcelesticetin (IV) has an $Rf$ of 0.05 and N-demethylcelesticetin (IVa) has an $Rf$ of 0.15.

Alkaline hydrolysis of N-demethyl-7-O-demethylcelesticetin (IV) and N-demethylcelesticetin (VIa) with a suitable base, for example, sodium hydroxide, for 16 hours at room temperature results in the cleavage of the ester group and the formation of N-demethyl-7-O-demethyldesalicetin (V) and N-demethyldesalicetin (Va), respectively. Other bases, for example, aqueous ammonium hydroxide and organic amines can be used instead of sodium hydroxide. The reaction can be carried out in solvents like lower alcohols (methanol, ethanol) by refluxing in the presence of base. Duration of the treatment depends on the strength of the base and the temperature used.

Salicylic acid, which is formed as a by-product during the above reaction, can be removed by extraction with ether at pH 3.0.

Hydrazinolysis of N-demethyl-7-O-demethylcelesticetin (IV) with hydrazine hydrate at reflux for about 23 hours affords proline hydrazide which can be transformed to proline hydrochloride by heating with aqueous hydrochloric acid. The second product of the above hydrazinolysis reaction is β-hydroxyethylthiolincosaminide (β-HETL) (VI).

N-demethyl-7-O-demethyldesalicetin (V) and N-demethyldesalicetin (Va) exist either in the non-protonated (free base) form or the protonated (salt) form depending on the pH of the environment. Acid addition salts of these compounds can be made as disclosed for the N-demethyl-7-O-demethylcelesticetin (IV) and N-demethylcelesticetin (IVa).

N-demethyl-7-O-demethylcelesticetin (IV) and N-demethylcelesticetin (IVa) and their salts are active against *Staphylococcus aureus* and *Streptococcus faecalis* and can be used to disinfect washed and stacked food utensils contaminated with these bacteria; they can also be used as disinfectants on various dental and medical equipment contaminated with *Staphylococcus aureus*. Further, since these antibiotics are active against *Streptococcus hemolyticus*, they can be used to disinfect instruments, utensils or surfaces where the inactivation of this organism is desirable.

N-demethyl-7-O-demethyldesalicetin (V) and N-demethyldesalicetin (Va), and their salts, are active against *Staphylococcus aureus* and can be used for the same purposes given for N-demethyl-7-O-demethylcelesticetin (IV) and N-demethylcelesticetin (VIa).

N-demethyl-7-O-demethylcelesticetin (IV) and N-demethylcelesticetin (IVa) can be converted to various antibacterially active analogues as represented by structural formulae VII, VIIa, VIII, and VIIIa. In the following discussion, in cases where acylation, phosphorylation, or 7-epimerization via 7-oxidation of compounds, IV, IVa, V, or Va are involved, the compound being reacted should be suitably N-protected according to the art, for example as the N-carbobenzoxy derivtaive. The carbobenzoxy group is removed after reaction or at a suitable later time by hydrogenolysis, according to the art. For example, N-demethyl-7-epi-7-O-demethylcelesticetin can be prepared by the procedure disclosed in U.S. 3,514,440, column 2, line 44 to column 3, line 10; N-demethyl-7(R)- and 7(S)-halo-7-demethoxycelesticetin can be prepared by the methods disclosed in U.S. 3,496,163, using the "modified Rydon procedure" as given in Example 6 of said patent; N - demethyl-7(R)-O-alkyl-7-O-demethylcelesticetin can be prepared by esterification of N-demethyl-7(R)-alkyl-7-O-demethyldesalicetin at the primary hydroxyl with salicyloyl chloride as disclosed in U.S. 2,851,463, especially column 2, lines 70 et seq.; N-demethyl-7(S)-O-alkyl-7-O-demethylcelesticetin can be prepared from N-demethyl-7(S)-O-alkyl-7-O-demethyldesalicetin by the procedure disclosed above for the preparation of the 7(R) isomer; 2-O-phosphates can be prepared by the procedures disclosed in U.S. 2,487,068; 2-O-acylates can be prepared by the acylation procedures disclosed in U.S. 3,326,891 and U.S. 3,426,012; and N-alkyl compounds of formulae VII and VIIa can be prepared by procedures disclosed in U.S. 3,380,992 with the provision that the starting compound of formula V in U.S. 3,380,992 is to be the present compound of formula IV or IVa in the subject invention; i.e. wherein Y of formula V in U.S. 3,380,992 is

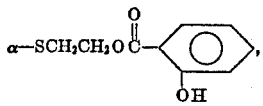

$R_1$ is —$CH_3$ and R, $R_2$ and $R_3$ are H for IV and $R_1$ and $R_2$ are —$CH_3$, R and $R_3$ are H for IVa. The most pertinent portions of U.S. 3,380,992 are column 2, lines 17 et seq., column 13, lines 43–69, and Example 1, parts F–2 to F–4 and G–1, column 19, line 74 to column 20, line 52.

N-hydroxyalkyl compounds for formulae VII and VIIa can be prepared by reacting the compound of formula IV or IVa, advantageously as the hydrochloride acid addition salt, with ethylene oxide, propylene oxide, butylene oxide or pentylene oxide, preferably in a pressure vessel in which the reaction proceeds as follows as illustrated with ethylene oxide:

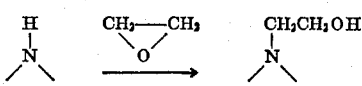

The reaction mixture after cooling is worked up in the usual manner using such procedures as distillation, solvent extraction, crystallization and the like.

The proportions are not critical but an excess of alkylene oxide is desirable. An excess of from 2 to 100 times the stoichiometric amount is suitable. The temperature also is not critical. At temperatures below about 35° C., however, the reaction is undesirably slow and ordinarily it will not be necessary or desirable to exceed about 200° C. The reaction proceeds well at 100° C.

Advantageously the reaction is carried out in an inert mutual solvent for the reactants. Suitable such solvents include methyl alcohol, ethyl alcohol, propyl alcohol, benzene, toluene, cyclohexane, and tetrahydrofuran.

Alternatively the alkylation can be effected by a reductive alkylation such as described in U.S. Pat. 3,496,-163, Part G1–4, by substituting the formaldehyde (formalin) by hydroxyacetaldehyde, 3-hydroxypropionaldehyde, 4-hydroxybutyraldehyde or 5-hydroxypentaldehyde.

Salts of the compounds of structural formulae VII and VIIa can be made as disclosed for compounds IV and IVa. These salts are useful in the same manner as the non-protonated compounds, and further, they can be used to upgrade the non-protonated compounds by procedures well known in the art.

N-demethyl-7-O-demethyldesalicetin (V) and N-demethyldesalicetin (Va) can be converted to various antibacterially active analogues as represented by structural formulae VIII and VIIIa. For example, N-demethyl-7-epi-7-O-demethyldesalicetin can be prepared by hydrolysis of the β-O-salicylyl acyl of N-demethyl-7-epi-7-O-demethylcelesticetin by methods disclosed in U.S. 2,851,-463, especially column 1, line 27 to column 2, line 56 [N-demethyl-7-epi-7-O-demethylcelesticetin can be prepared by methods disclosed in U.S. 3,514,440, as noted above]; β-acylates of N-demethyl-7-epi-7-O-demethyldesalicetin and N-demethyldesalicetin can be prepared by the procedures disclosed in U.S. 2,851,463, particularly those disclosed in column 2, line 56 to column 3, line 16; N-demethyl-7(R)- and -7(S)-halo-7-demethoxydesalicetin can be prepared by hydrolysis of N-demethyl-7(R)- and -7(S)-halo-7 - demethoxycelesticetin by methods disclosed in U.S. 2,851,463, especially column 1, line 27 to column 2, line 56, except that the process should be carried out at room temperature, at a pH of 8–10, preferably about pH 10, so as to selectively remove the salicyloyl and not hydrolyze off the 7-halo group [N-dimethyl-7(R)- and -7(S)-halo-7-demethoxycelesticetin can be prepared by methods disclosed in U.S. 3,496,163, as noted above]; N-demethyl-7(R)-O-alkyl-7-O-demethyldesalicetin can be prepared by reacting N-demethyl-7(R)-O-alkyl-HETL [this compound can be prepared by substituting HETL (VI) for the compound methyl thiolincosaminide (MTL) in the procedures disclosed in U.S. 3,574,187] with ethyl chloroformate according to methods known in the art to give the N-demethyl-7(R)-O-alkyl-HETL β-O-ethylcarbonate ester which then can be N-acylated with N-carbobenzoxy-L-proline by the procedures disclosed in U.S. 3,380,992, especially Example 6—the ethyl carbonate ester protective group can be removed by treatment with a mild base, e.g. NaHCO_3; N-demethyl-7(S)-O-alkyl-7-O-demethyldesalicetin can be prepared from N-demethyl-7(S)-O-alkyl-7-O-demethyl-HETL according to the procedure given above for the 7(R) isomer; 2-O-phosphates can be prepared by first preparing the β-O-(alkyl carbonate)-ester of N-demethyl-7 - O-demethyldesalicetin (V) or N-demethyldesalicetin (Va) by reaction of the desalicetin compound with an alkyl chloroformate using procedures known in the art, and then phosphorylating the reaction product according to the procedures disclosed in U.S. 3,487,068—the alkyl carbonate protective group can be removed by treatment of the phosphorylated product with mild base, e.g. NaHCO_3; β-O-acylates can be prepared by the procedures disclosed in U.S. 2,851,-463, especially column 2, lines 70 et seq. using one mole of acylating agent per mole of desalicetin compound; 2-O-acylates can be prepared by the acylation procedures disclosed in U.S. 3,326,891 and U.S. 3,426,012; N-alkyl and N-hydroxyalkyl compounds of formulae VIII and VIIIa can be prepared as described above for similar derivatives of formulae VII and VIIa.

Acid addition salts of the compounds of structural formulae VIII and VIIIa can be made as disclosed for compounds IV and IVa. These salts are useful in the same manner as the non-protonated compounds, and, further, they can be used to upgrade the nonprotonated compounds by procedures well known in the art.

The following examples are illustrative of the process and products of the present invention, but are not to be construed as limiting. All percentages are by weight and all solvent mixture proportions are by volume unless otherwise noted.

EXAMPLE 1

N-demethyl-7-O-demethylcelesticetin (IV)

Part A.—Fermentation: Mycelium and/or spores from a slant of *Streptomyces caelestis* strain 22218a, NRRL 5481, are used to inoculate a series of 500-ml. Erlenmeyer flasks each containing 100 ml. of seed medium consisting of the following ingredients:

|  | Gm./l. |
|---|---|
| Glucose monohydrate | 25 |
| Pharmamedia [1] | 25 |
| Tap water, q.s. 1 liter. | |

[1] Pharmamedia is an industrial grade of cottonseed flour produced by Trader's Oil Co., Fort Worth, Tex.

The presterilization pH of the seed medium is 7.2. The seed is grown for three days at 28° C. on a Gump rotary shaker operating at 250 r.p.m.

The fermentation proper is carried out in the medium of the following composition:

|  | Gm./l. |
|---|---|
| Glucose monohydrate | 25 |
| Wilson's Peptone Liquor No. 159 [1] | 15 |
| Yeast extract | 2.5 |
| Tap water, q.s. 1 liter. | |

[1] Wilson's Peptone Liquor No. 159 is a preparation of enzymatically hydrolyzed proteins of animal origin.

The medium is adjusted to pH 7.2–7.4 with 50% sodium hydroxide, distributed in 100 ml. volumes/500 ml. Erlenmeyer flasks and sterilized at 120° C. for thirty (30) minutes. The inoculated flasks (5% inoculum) are incubated at 28° C. on a Gump rotary shaker operating at 250 r.p.m. Optimum production of N-demethyl-7-O-demethylcelesticetin (IV) and N-demethylcelesticetin (IVa) is obtained after about four days of fermentation. The titer of these antibiotics in the fermentation beer is determined by the activity of the antibiotics against the microorganism *S. lutea* by a standard microbiological disc plate assay using 12.5 mm. discs.

A scaled-up fermentation process is as follows:

| Shake flask pre-seed medium: | Gm./l. |
|---|---|
| Glucose monohydrate | 10 |
| Wilson's Peptone Liquor No. 159 | 10 |
| Cornsteep liquor | 10 |
| Pharmamedia | 2 |
| Tap water, q.s. 1 liter. | |

The medium is adjusted to pH 7.2 with aqueous sodium hydroxide, sterilized in a series of 500-ml. Erlenmeyer flasks each containing 100 ml. of seed medium. The flasks are inoculated from slants with *Streptomyces caelestis* strain 22218a, NRRL 5481, and the seed flasks are then grown for three days at 28° C. on a Gump rotary shaker operating at 250 r.p.m. Three shake flasks (300 ml.) of the pre-seed inoculum, described above, are used to inoculate a 300-liter seed tank containing 250 liters of the seed medium described above for the seed flasks with the addition of Ucon (a polyalkylene glycol synthetic defoaming fluid supplied by Union Carbide Chemical Co.) as an antifoaming agent. The seed tank is maintained at a temperature of 28° C. for 48 hours with agitation (280 r.p.m.) and air flow of 100 s.c.f.m. (standard cubic feet/minute) at 15 p.s.ig.

The seed tank, described above, is used to inoculate a 7000-liter fermentation tank containing 5000 liters of the following sterile medium:

|  | Gm./l. |
|---|---|
| Glucose monohydrate | 15 |
| Wilson's Peptone Liquor No. 159 | 15 |
| Yeast extract | 1 |

Ucon is added as an antifoaming agent. The fermentation tank is inoculated at the rate of 5% seed and maintained at 28° C. for four days with an air flow of 80 s.c.f.m. at 10 p.s.i.g. and agitation at a rate of 166 r.p.m.

Part B.—Recovery.—Whole fermentation beer (approximately 4400 liters), obtained as described above, is filtered using diatomaceous earth as a filter aid. The filter cake is washed with water. The wash is combined with the clear beer and the combined solution is passed through 150 liters of Amberlite XAD-2 resin at a flow rate of 150 liters per hour. The spent beer is discarded. The column is washed with water (75 liters) and then eluted with 1100 liters of 95% aqueous methanol. The methanolic eluates are collected in two pools: Pool I (430 l.) is concentrated to dryness; yield, 1275 g. Pool II (970 l.) is also concentrated to dryness; yield 343 g.

Part C.—Isolation of N-demethyl-7-O-demethylcelesticetin hydrochloride by counter double current distribution: A portion of Pool I, described above, is subjected to purification by counter double current distribution using a solvent system consisting of 1-butanol-water (1:1) to obtain crystalline N-demethyl 7-O-demethylcelesticetin hydrochloride. 50 g. of the material obtained from Pool I is dissolved in both phases (200 ml. of each phase) of the above-noted solvent system and the pH is adjusted to 3.5 with 2 N aqueous hydrochloric acid. The solution is put in tubes 12–20 at the point where the lower phase enters the countercurrent distribution machine. The following transfers are run:

(1) 30 transfers without collecting fractions.
(2) 32 transfers with collection of the upper phase only.
(3) 50 transfers collecting both upper and lower phases.

The distribution is analyzed by determination of bioactivity of selected fractions against *S. lutea*.

*Fraction No.:*

| Lower collector: | Zone (mm.) of inhibition |
|---|---|
| 0 | 13 |
| 5 | 0 |
| 10 | 0 |
| 15 | Traces |
| 20 | 11 |
| 25 | 12.5 |
| 30 | 14 |
| 35 | 14.5 |
| 40 | 16 |
| 45 | 17 |
| 50 | — |
| Lower machine: | |
| 50 | 16.5 |
| 45 | 17 |
| 40 | 22.5 |
| 35 | 28.5 |
| 30 | 30 |
| 25 | 30.5 |
| 20 | 30.5 |
| 15 | 28.5 |
| 10 | 26.5 |
| 5 | 23 |
| 0 | 20 |
| Upper machine: | |
| 5 | 13 |
| 10 | 11 |
| 15 | 11 |

TABLE—Continued

Fraction No.:
Upper machine: Zone (mm.) of inhibition
- 20 — 10
- 25 — Traces
- 30 — Traces
- 35 — Traces
- 40 — 15
- 45 — Traces
- 50 — 0

Upper collector:
- 82 — 0
- 75 — 13
- 70 — 12.5
- 65 — 0
- 60 — 0
- 55 — 0
- 50 — 11
- 45 — 0
- 40 — 0
- 35 — 0
- 30 — Traces
- 25 — 10
- 20 — 12
- 15 — 17
- 10 — 22.5
- 5 — 23
- 0 — 18

Selected fractions are pooled. Each pool is concentrated to dryness *in vacuo* to give the following preparations respectively.

Pool AI, lower collector 30–50; lower machine 50–46. Pool BI, lower machine 37–0. Pool CI, upper collector 15–0. Pool AI contains traces of bio-activity and is discarded. Pool BI is dissolved in a minimum amount of methanol and the solutions are mixed with 200 ml. of ether. The resulting precipitated material is collected by filtration and dried; yield, 2.13 g., labelled BI–1.

Pool CI is triturated with 200 ml. of ether and the insoluble material (1.45 g.) is labelled CI–1.

Following the above procedures, five additional counter double current distribution runs are performed using 50 g. of Pool I starting material each time. From Pool BII (lower machine (40–0)) there are obtained five preparations which are combined and triturated with 150 ml. of absolute methanol. The resulting insoluble crystalline material is analyzed and the results show that this material (700 mg.) is pure N-demethyl-7-O-demethylcelesticetin hydrochloride (IV).

EXAMPLE 2

N-demethylcelesticetin (IVa)

The filtrate from the trituration with methanol of the five preparations obtained from Pool BII, as disclosed in Example 1, is added to two liters of ether. The resulting precipitated material is isolated by filtration and dried; yield, 10.63 g., labelled BII–1. This material is combined with preparation labelled BI–1, obtained as disclosed in Example 1, to give 12.7 g. of material containing N-demethylcelesticetin (IVa), and labelled BII–2. This material is then subjected to counter current distribution using the solvent system 1-butanol-water (1:1 v./v.). The starting material (12.7 g. of preparation BII–2) is dissolved in both phases of the above-noted solvent system and added into five tubes of a 500-tube all glass counter current distribution apparatus. The distribution is analyzed for antibiotic content by using *Sarcina lutea* as the test organism.

After 1500 transfers, tubes 340–400 are combined and the solution concentrated to dryness. The residue is dissolved in 50 ml. of methanol and this solution is mixed with one liter of ether to give a precipitate; yield, 1.5 g. labelled BII–3. This material is found by TLC chromatography (silica gel G, chloroform-methanol 6:1 v./v.) to be a mixture of N-demethylcelesticetin (IVa) and N-demethyl-7-O-demethylcelesticetin (IV). These two antibiotics are separated by silica gel chromatography as follows: The silica gel chromatography column is prepared from 250 g. of silica gel G (Merck-Darmstadt ART. 7734) packed in the solvent system consisting of chloroform-methanol (6:1 v./v.). The starting material (1.3 g. of BII–3) is dissolved in the solvent and the solution is mixed with 20 g. of silica gel. The mixture is concentrated to dryness and the obtained powder is added on the top of the column bed. The column is eluted with the above solvent system. Fractions (20 ml. each) are analyzed by bio-activity against *Sarcina lutea* and ultraviolet determinations. Results follow.

| Fraction number | Zone (*S. lutea*, mm.) | UV ($\lambda_{max}$. OD) |
|---|---|---|
| 5 | 0 | |
| 10 | 0 | |
| 15 | 0 | |
| . | . | |
| . | . | |
| 85 | 0 | |
| 90 | 0 | |
| 95 | 0 | |
| 100 | 0 | |
| 105 | 0 | |
| 110 | 0 | |
| 115 | 0 | |
| 120 | 0 | |
| 125 | 0 | |
| 130 | Traces | |
| 135 | 8.5 | |
| 140 | 11 | |
| 145 | 13.5 | |
| 150 | 17.5 | |
| 155 | 22.5 | |
| 160 | 25.5 | 305 (0.77). |
| 165 | 26.5 | |
| 170 | 28 | 305 (1.18). |
| 175 | 27.5 | |
| 180 | 27.5 | 305 (1.26). |
| 185 | 27.5 | |
| 190 | 27 | 305 (1.22). |
| 195 | 27.5 | |
| 200 | 26 | 305 (1.05). |
| 205 | 25.5 | |
| 210 | 25 | 305 (0.87). |
| 215 | 24.5 | |
| 220 | 24.5 | 305 (0.70). |
| | 28.5 | |
| 225 | 28 | |
| 230 | 27 | 305 (0.57). |
| 235 | 26 | |
| 240 | 26 | 305 (0.48). |
| 245 | 24 | |
| 250 | 23 | 305 (0.40). |
| 255 | 23 | |
| 260 | 23 | 305 (0.36). |
| 265 | 22.5 | |
| 270 | 21 | 305 (0.30). |
| 275 | 21 | |
| 280 | 20.5 | 305 (0.26). |
| 285 | 20 | |
| 290 | 20 | 305 (0.23). |
| 295 | 19.5 | |
| 300 | 19 | 305 (0.23). |
| 310 | 17.5 | 305 (0.20). |
| 320 | 17.5 | 305 (0.24). |
| 330 | 16 | 310 (0.40). |
| 340 | | |
| 350 | 13 | Nondescriptive UV. |
| . | . | |
| 400 | 12 | Do. |
| . | . | |
| 500 | 12 | Do. |
| . | . | |
| 600 | Traces | Do. |

Fractions 160–240 are combined and the solution is concentrated to dryness. The residue is dissolved in 1 N methanolic hydrogen chloride (10 ml.) and this solution is mixed with ether. The resulting precipitated material is isolated by filtration and dried; yield, 130 mg. of N-demethylcelesticetin hydrochloride (VIa).

EXAMPLE 3

N-demethyl-7-O-demethyldesalicetin (V)

Upon the treatment of N-demethyl-7-O-demethylcelesticetin (IV) with 50% aqueous NaOH for about 16 hours at room temperature, there is produced N-demethyl-7-O-demethyldesalicetin (V). Salicylic acid which is formed as a by-product during the reaction can be removed by extraction with ether at pH 3.0.

EXAMPLE 4

N-demethyldesalicetin (Va)

Upon the treatment of N-demethylcelesticetin (IVa) with 50% aqueous NaOH for about 16 hours at room temperature, there is produced N-demethyldesalicetin (Va). Salicyclic acid which is formed as a by-product during the reaction can be removed by extraction with ether at pH 3.0.

EXAMPLE 5

β-Hydroxyethylthiol incosaminide (β-HETL) (VI)

Upon hydrazinolysis of N-demethyl-7-O-demethylcelesticetin (IV) with hydrazine hydrate at reflux for about 23 hours, where is produced β-HETL, proline hydrazide and salicylic acid hydrazide. β-HETL is recovered from the reaction mixture by counter current distribution in the solvent system consisting of equal volumes of 1-butanol and water. This procedure separates β-HETL from proline hydrazide and salicylic acid hydrazide.

What is claimed is:

1. A compound having the structural formula:

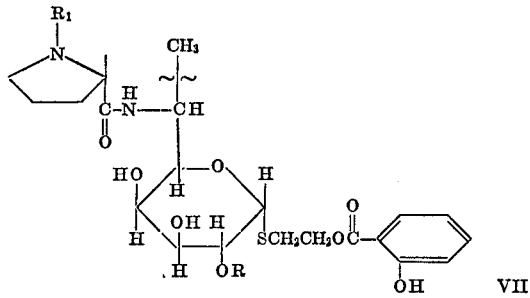

VII wherein X is —OH in the (R) and (S) configuration; halo, wherein halo is chlorine, bromine, or iodine, in the (R) and (S) configuration; alkoxy of not more than 20 carbon atoms in the (R) and (S) configuration; R is selected from the group consisting of hydrocarbon carboxylic acid acyl of not more than 18 carbon atoms, or a halo-, nitro-, hydroxy-, amino-, thiocyano-, and loweralkoxy-hydrocarbon carboxyic acid acyl of not more than 18 carbon atoms, inclusive, and

and $R_1$ is hydrogen, or alkyl of from 2 to 20 carbon atoms, inclusive, or hydroxyalkyl of from 2 to 5 carbon atoms, inclusive; and salts thereof.

2. A compound having the structural formula:

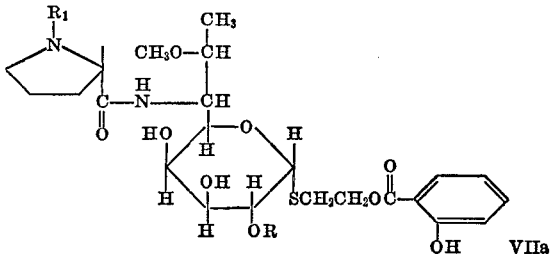

VIIa wherein R is selected from the group consisting of hydrocarbon carboxylic acid acyl of not more than 18 carbon atoms, or a halo-, nitro-, hydroxy-, amino-, thiocyano-, and loweralkoxy-hydrocarbon carboxylic acid acyl of not more than 18 carbon atoms, inclusive,

and $R_1$ is hydrogen, or alkyl of from 2 to 20 carbon atoms, inclusive, or hydroxyalkyl of from 2 to 5 carbon atoms, inclusive; and salts thereof.

3. A compound having the structural formula:

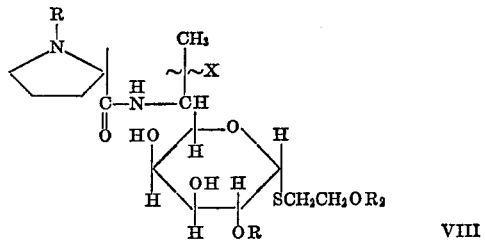

VIII wherein X, R, and $R_1$ are as defined in claim 1 and $R_2$ is selected from the group consisting of hydrogen, hydrocarbon carboxylic acid acyl of not more than 18 carbon atoms, or a halo-, nitro-, hydroxy-, amino-, thiocyano-, and loweralkoxy-hydrocarbon carboxylic acid acyl of not more than 18 carbon atoms, inclusive; and acid addition salts thereof.

4. A compound having the structural formula:

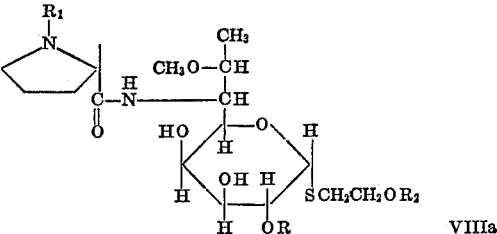

VIIIa wherein R and $R_1$ are as defined in claim 1; and $R_2$ is selected from the group consisting of hydrogen hydrocarbon carboxylic acid acyl of not more than 18 carbon atoms, or a halo-, nitro-, hydroxy-, amino-, thiocyano-, and loweralkoxy-hydrocarbon carboxylic acid acyl of not more than 18 carbon atoms, inclusive; and acid addition salts thereof.

References Cited

UNITED STATES PATENTS

| | | | |
|---|---|---|---|
| 2,851,463 | 9/1958 | Hinman et al. | 260—210 R |
| 3,208,996 | 9/1965 | Hoeksema | 260—210 R |
| 3,337,527 | 8/1967 | Bannister et al. | 260—210 R |
| 3,366,624 | 1/1968 | Argoudelis et al. | 260—210 R |
| 3,487,068 | 12/1969 | Morozowich et al. | 260—210 R |
| 3,502,648 | 3/1970 | Birkenmeyer et al. | 260—210 R |
| 3,544,552 | 12/1970 | Argoudelis et al. | 260—210 R |
| 3,671,647 | 6/1972 | Argoudelis et al. | 260—210 R |
| 3,674,647 | 7/1972 | Visser | 260—210 R |

JOHNNIE R. BROWN, Primary Examiner

U.S. Cl. X.R.

195—80; 424—180

UNITED STATES PATENT OFFICE
CERTIFICATE OF CORRECTION

Patent No. 3,812,096　　　　　　　Dated May 31, 1974

Inventor(s) A.D. Argoudelis, J.H. Coats, and O.K. Sebek

It is certified that error appears in the above-identified patent and that said Letters Patent are hereby corrected as shown below:

Column 3, line 1, for "B-hydroxyethylthioincosaminide" read -- B-hydroxyethylthiolincosaminide --; line 32, for "(R)=OCH₃" read -- (R)-OCH₃ --. Column 4, line 20, for "(R)-OCH₂" read -- (R)-OCH₃ --. Column 6, line 62, for "mcq." read -- mcg. --. Column 7, lines 27-28, for "reciproca lcentimeters! CMFW eral oil mull expressed in reciprocal centimeters:" read -- reciprocal centimeters: --. Column 10, line 38, for "Ektachorme" read -- Ektachrome --. Column 5, table 2, for "6418" read -- 2418 --. Column 12, table 3, line 2, for "Agar medium" read -- Broth media --. Column 12, table 5, line 48, for "and" read -- of --; line 62, for "+" read -- ++ --. Column 15, line 22, for "derivtaive" read -- derivative --; line 33, for "-7(R)-alkyl-" read -- -7(R)-O-alkyl- --; line 40, for "2,487,068" read -- 3,487,068 --. Column 21, line 9, for "Salicyclic" read -- Salicylic --; line 17, for "where" read -- there --; line 46, for "carboxyic" read -- carboxylic --. Column 22, line 45-46, for "hydrogen hydrocarbon" read -- hydrogen, hydrocarbon --.

Signed and sealed this 1st day of October 1974.

(SEAL)
Attest:

McCOY M. GIBSON JR.　　　　　　　　　C. MARSHALL DANN
Attesting Officer　　　　　　　　　　　Commissioner of Patents